United States Patent [19]

Leiber

[11] Patent Number: 4,462,642
[45] Date of Patent: Jul. 31, 1984

[54] VEHICLE BRAKE SYSTEM

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 382,456

[22] Filed: May 24, 1982

[30] Foreign Application Priority Data

Jun. 24, 1981 [DE] Fed. Rep. of Germany ....... 3124755

[51] Int. Cl.³ .............................................. B60T 8/02
[52] U.S. Cl. .................................... 303/119; 303/92; 303/116
[58] Field of Search ................... 303/10, 92, 100, 103, 303/105, 110, 113, 119, 116; 188/181 A, 181 R, 181 C

[56] References Cited

U.S. PATENT DOCUMENTS 3,802,745  4/1974  Strifler et al. ........................ 303/113
3,827,761  8/1974  Inada .................................... 303/113

FOREIGN PATENT DOCUMENTS 3024184  1/1982  Fed. Rep. of Germany ...... 303/119

Primary Examiner—Bruce H. Stoner, Jr.
Assistant Examiner—Alvin E. Oberley
Attorney, Agent, or Firm—Edwin E. Greigg

[57] ABSTRACT

A vehicle brake system is proposed, which has a wheel brake cylinder that can be placed under pressure either by a main cylinder or by a servopressure supply apparatus, and which is further provided with an anti-wheel lock apparatus that has a multiple-position valve for monitoring a line passage to the brake cylinder. Both before and after the multiple-position valve there is provided a pressure gauge which is selectively actuated either electrically or hydraulically, the input signals of which are compared with one another. The result is delivered as a control signal to the multiple-position valve. In this manner, it is possible to use a conventional main cylinder for a vehicle brake which has amplification and anti-wheel-lock provisions. The vehicle brake system is preferably usable in passenger vehicles or lightweight commercial vehicles.

18 Claims, 9 Drawing Figures

VEHICLE BRAKE SYSTEM

BACKGROUND OF THE INVENTION

The invention is directed to vehicle brake systems having an anti-locking apparatus including a multi-position valve and a servo-pressure supply apparatus. A brake system of this kind is known from German Offenlegungsschrift No. 23 27 508. In this system, there is used a main cylinder which comes into operation if there is a failure in the servopressure supply apparatus or if there is a malfunction in an electronic amplifier system. This known system also has adjusting members for an anti-wheel-lock apparatus and further provides valves for supplying pressure to the brake system. This kind of design is relatively expensive.

A brake system without a main cylinder is also known from German Offenlegungsschrift No. 19 61 039. This known system functions with one pressure gauge at the brake pedal and one pressure gauge in the wheel brake circuit. The pressure is fed into or removed from the brake circuit by way of magnetic valves. The magnetic valves and an electronic circuit are used both for brake force amplification and for an anti-wheel-lock apparatus. This known system is again expensive. Furthermore, for safety reasons, it cannot be used in passenger vehicles, because no further braking effect is possible if there is a malfunction.

OBJECT AND SUMMARY OF THE INVENTION

The vehicle brake system having the characteristics revealed herein has the advantage over the prior art that a normal main cylinder can be used which, in cooperation with an electromagnetically actuated multiple-position valve and with presssure gauges in both a primary circuit and a secondary circuit, enables brake force amplification using electronic means. This multiple-position valve is used for the functions of both brake force amplification and anti-wheel-locking.

Further advantages of the invention are described below and disclosed in the dependent claims.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
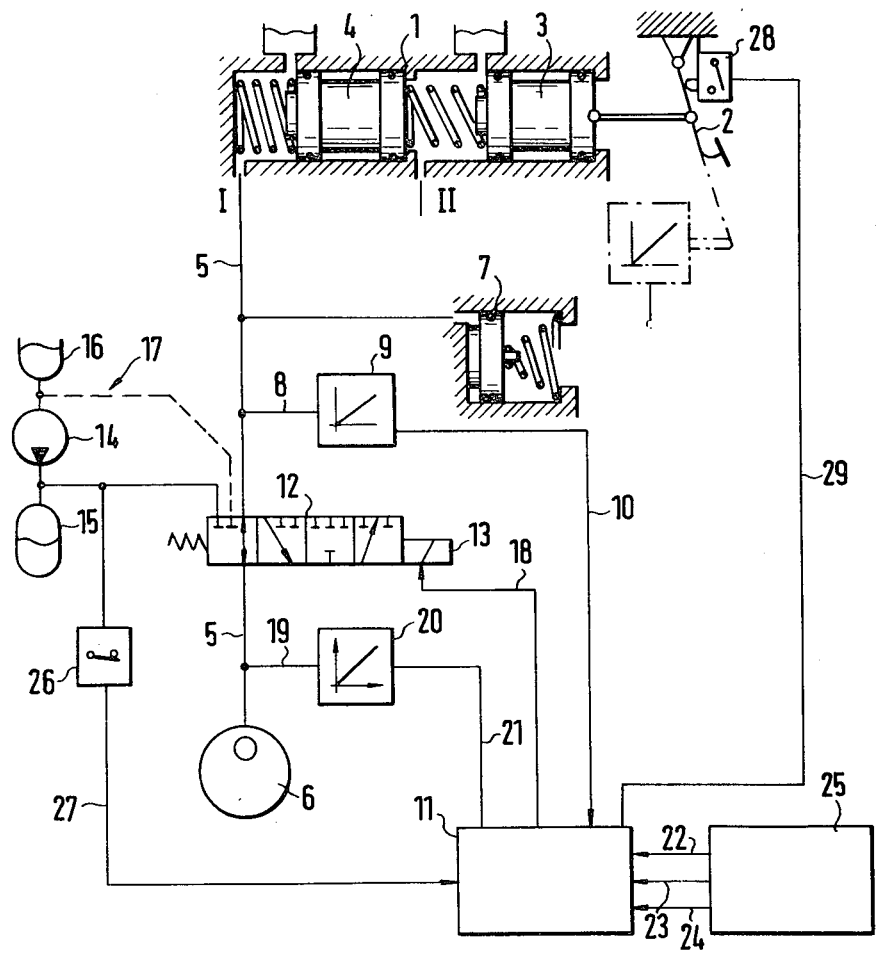
FIG. 1 shows a vehicle brake system having electrical pressure gauges and a 4/4-way multiple-position valve.

A vehicle brake system has a hydraulic main cylinder 1, which is embodied as a tandem main cylinder. It is actuated via a brake pedal 2 and supplies two brake circuits I and II, each having their own main cylinder piston 3 and 4.

A brake line 5 which is part of brake circuit I leads from the main cylinder 1 to a wheel brake cylinder 6. A branch line is connected to this brake line 5 and leads to a travel path simulator 7, which gives the driver an improved braking sensation. A branch line 8 is also provided, which leads to an electrical pressure gauge 9, which is embodied as an electrical pressure transducer and is connected via a control line 10 to an electronic braking unit 11.

Following the connection for the branch line 8 to the pressure gauge 9 in the brake line 5 is a multiple-position valve 12, which can assume four positions, being actuated via a magnet 13. The valve has four connections, two for the brake line 5, one for the pressure side of a servopressure supply apparatus 17 comprising a pump 14, storage tank 15 and reservoir 16, and one providing communication with the reservoir 16. In a third position, all the connections are unlocked, and a fourth position enables the brake cylinder 6 to communicate with the reservoir 16. The magnet 13 of the multiple-position valve 12 is triggered by the electronic braking unit 11 via a line 18.

Between the multiple-position valve 12 and the wheel cylinder 6, a second branch line 19 branches off from the brake line 5, leading to a pressure gauge 20 embodied like the pressure gauge 9. This second pressure gauge 20 is also connected to the electronic braking unit 11, this time via a control line 21.

The electronic braking unit 11 is connected via three lines 22, 23, 24 to an electronic anti-wheel-lock control unit 25. The three lines 22, 23, 24 furnish the switching signals for the magnet 13 in accordance with the positions 2, 3 and 4 of the multiple-position valve 12 for pressure increase, pressure maintenance and pressure reduction, respectively. It should also be noted, finally, that an electrical signal representing the pressure in the storage tank 15 is fed back to the electronic braking unit 11 via a switch 26 and a line 27 and that a position switch 28 is provided on the brake pedal 2, again being connected to the braking unit 11, via a line 29.

MODE OF OPERATION

Upon the actuation of the brake pedal 2, a pressure is generated in the tandem main cylinder 1 for both brake circuits I and II. The travel path simulator 7 assures a pressure increase which is clearly perceptible to the driver. The resultant braking pressure in the brake line 5 is fed back to the electronic braking unit 11 by the two pressure gauges 9 and 20, compared there, and converted into switching signals for the magnet 13; then, by way of power output circuits also provided in the braking unit 11, the magnet 13 of the multiple-position valve 12 is triggered. The electronic braking unit 11 additionally receives a switching signal via the line 27 and the switch 28 if there is a failure of the servopressure supply apparatus 17. The electronic braking unit 11 cooperates with the electronic anti-wheel-lock control unit 25 in order that the multiple-position valve 12 will also be provided with the anti-wheel-locking switching positions. Corresponding switching signals are delivered to the anti-wheel-lock control unit 25 by wheel sensors, not shown.

It is noted that the multiple-position valve 12 together with the associated electronics is used for both brake force amplification and anti-wheel-locking functions. If the apparatus is intact, the main cylinder pressure serves only as the control pressure. The supply of pressure to the brake cylinder is effected in accordance with the electronic pressure comparison of the two pressures before and after the multiple-position valve 12, possibly coupled with the signal from the pedal-position switch 28. In accordance with the desired amplification, the signal of the pressure gauge 9 is reinforced or, alternatively, the signal of the pressure gauge 20 is attenuated. The control pressure of the main cylinder 1, by way of the electronic system, effects the triggering of the magnet 13 of the multiple-position valve 1-2, which feeds pressure from the servopressure supply apparatus 17 into the wheel brake cylinder 6 until such time as the desired braking pressure has been attained. If there is a reduction in the control pressure of the main cylinder 1, the multiple-position valve 12 assumes its fourth position, in which it reduces the wheel cylinder brake pressure. If there is a malfunction in the servopressure supply apparatus 17, the tandem main cylinder supplies pressure in the conventional manner to the brake circuits I and II.

Figure 2:
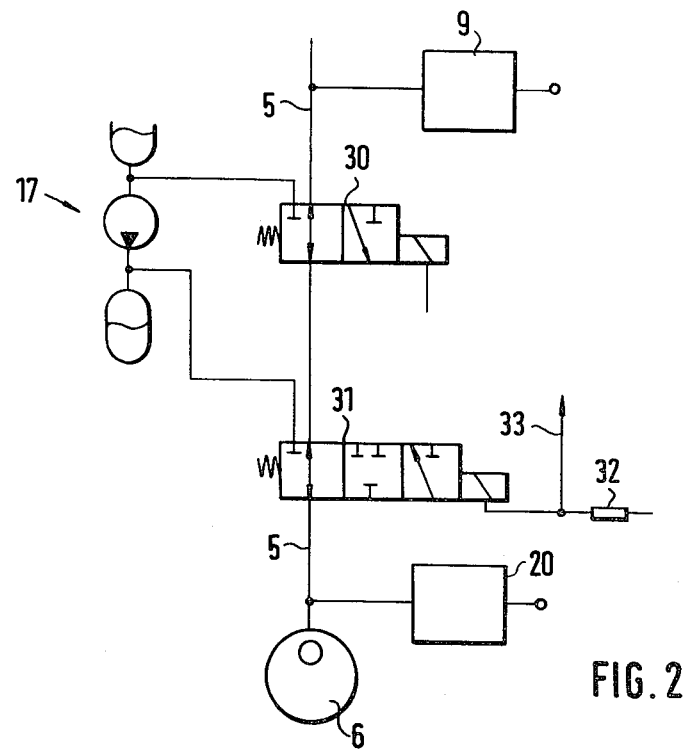
FIg. 2 shows a different multiple-position valve arrangement.

In FIG. 2, a different possibility is shown for the embodiment of the multiple-position valve 12. Elements corresponding to those of the embodiment shown in FIG. 1 are identified by the same reference numerals. In the embodiment of FIG. 2, one 3/2-way valve 30 and one 3/3-way valve 31 disposed following it are used. The 3/3-way valve 31, like the multiple-position valve 12, is triggered via various levels of electric current; a measuring transistor 32 is assigned for measuring the current of the valve. A corresponding reference signal is fed to the electronic braking unit 11 via a line 33.

Figure 3:
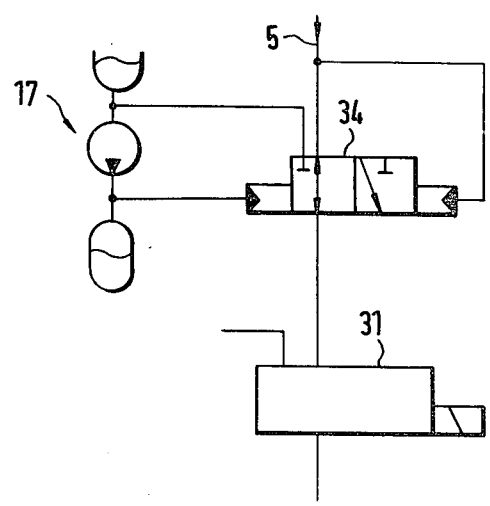
FIG. 3 shows a still further valve embodiment.

FIG. 3 shows a modification of the 3/2-way valve of FIG. 2. A 3/2-way valve 34 is actuated hydraulically in this embodiment, on the one hand by the servopressure supply apparatus 17 and on the other by the main cylinder pressure. The main cylinder pressure causes a switchover of the 3/2-way valve 34 to servopressure feed. The 3/3-way valve 31 in this case has a control function. If the set-point value is attained, for instance, then the 3/3-way valve 31 assumes the pressure maintenance position. If too much brake pressure is supplied to the wheel brake cylinder, then the pressure-relief position is triggered.

The supply of pressure when main cylinder pressure is available is prevented by the 3/2-way valve 34 whenever too little storage-tank pressure from the servopressure supply apparatus is available.

Figure 4:
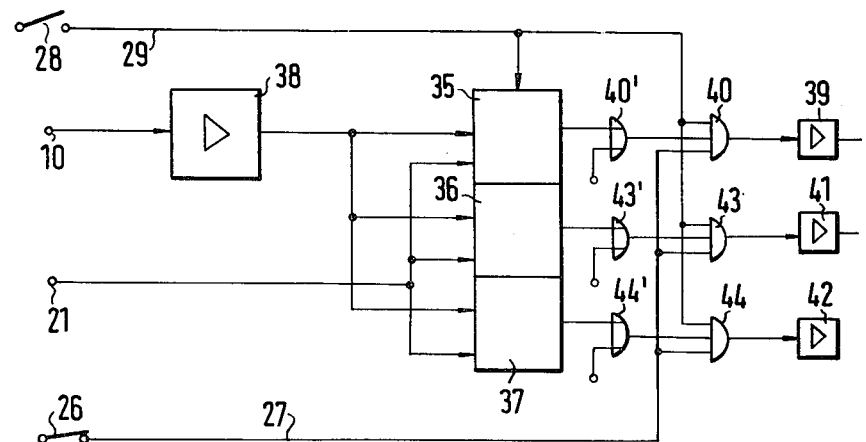
FIG. 4 is a circuit diagram for an electronic amplification system.

In FIG. 4, a circuit diagram for electronic amplification as performed in the electronic braking unit 11 is shown.

The signals produced by the two pressure gauges 9 and 20 are carried via the lines 10 and 21 to a comparator circuit comprising three comparators 35, 36 and 37. Prior to this, the signal from the pressure gauge 9 is amplified by the factor K in an amplifier 38. The level of amplification of this signal corresponds to the desired amount of amplification of the brake force amplification system.

The three comparators furnish an output signal, based on the condition $U1 \times K = U2$, for triggering the power output circuits 39, 41, and 42. This signal is carried via an OR gate 40' and an AND gate 40, for instance, and is delivered further from the AND gate 40 to the power output circuit 39 if the signal from the pedal switch 28 and from the storage-tank switch 36 if present and if the OR gate 40' influenced by the anti-wheel-locking signals has been appropriately triggered. The AND gate 40 is provided solely for safety reasons. Two further power output circuits 41 and 42 are provided, one of which (41) is intended for the pressure maintenance function and the other (42) for pressure relief. The two power output circuits 41 and 42 similarly have AND gates 43 and 44 for safety reasons.

Figure 5:
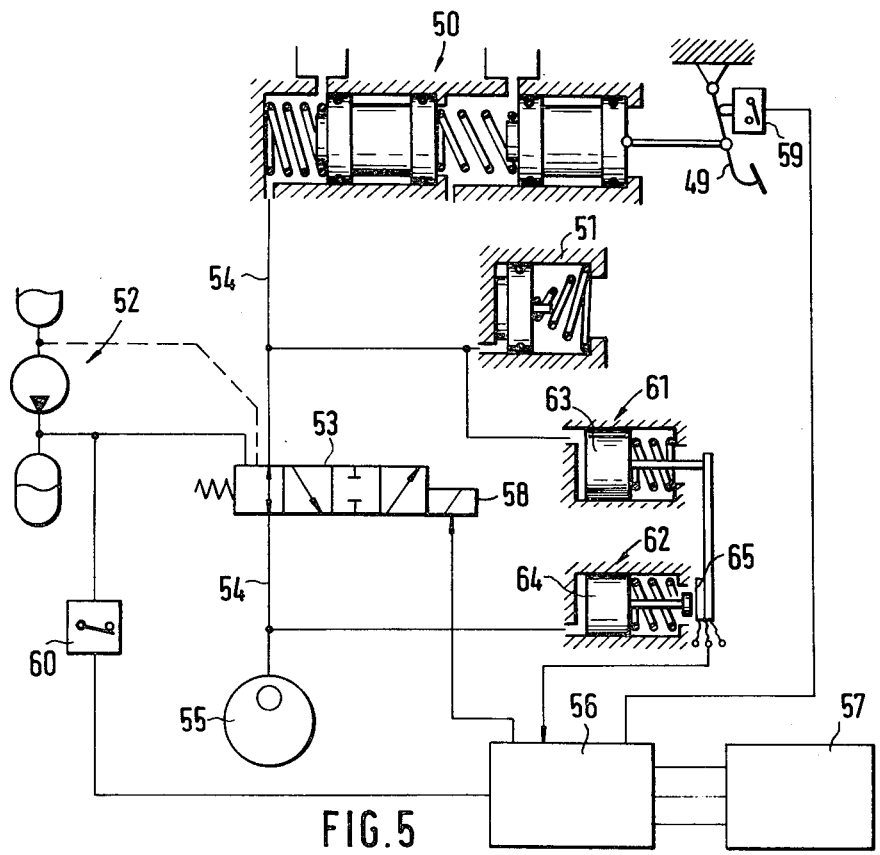
FIG. 5 shows a vehicle brake system having a hydraulically actuated pressure gauge.

FIG. 5 shows a different design for effecting the pressure measurement. The tandem main cylinder 50 with the travel path simulator 51 and brake pedal 49, servopressure supply apparatus 52, multiple-position valve 53, brake line 54 and wheel brake cylinder 55, the electronic braking unit 56 and the electronic anti-wheel-lock control unit 57, the triggering of the actuation magnet 58 and the switches 59 and 60 for pedal position and storage-tank pressure all correspond to the embodiment of FIG. 1.

Differing from the embodiment of FIG. 1, the embodiment of FIG. 5 has two pressure gauges 61 and 62, which are actuated hydraulically. For this reason, each has a piston member 63 and 64, and the piston member 63 of the presure gauge 61 located ahead of the multiple-position valve 53 has a larger diameter, corresponding to the desired amplification factor of brake force amplification, than the other piston member 64. Accordingly, it is possible in this embodiment to eliminate the amplifier 38 and two pressure transducers.

The advantages of this design are low electrical expenditure and relatively high tolerances for the travel path simulator. The design is also resistant to malfunctioning, because the brake force amplification is determined by the ratio of the surface areas of the two pistons 63 and 64.

Figure 6:
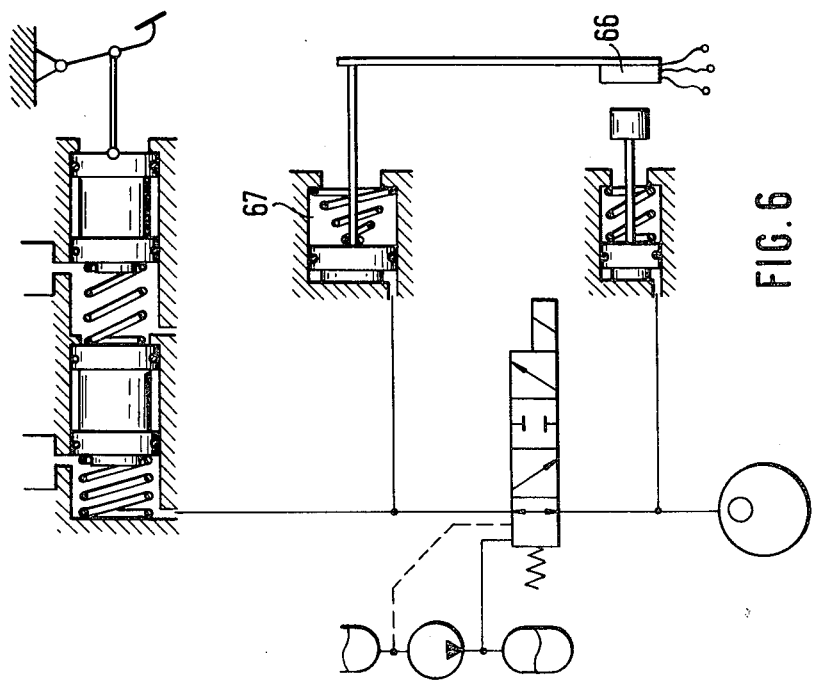
FIG. 6 is a simplification of the design shown in FIG. 5.

An electrical travel path meter 65 embodied as a position switch is disposed between the two pressure gagues 61 and 62. However, it is also possible to provide a Hall integrated circuit as the travel path meter 66, as shown in FIG. 6. Furthermore, in the design of FIG. 5, a pressure gauge 67 has the travel path simulator of the main cylinder integrated with it.

Figure 7:
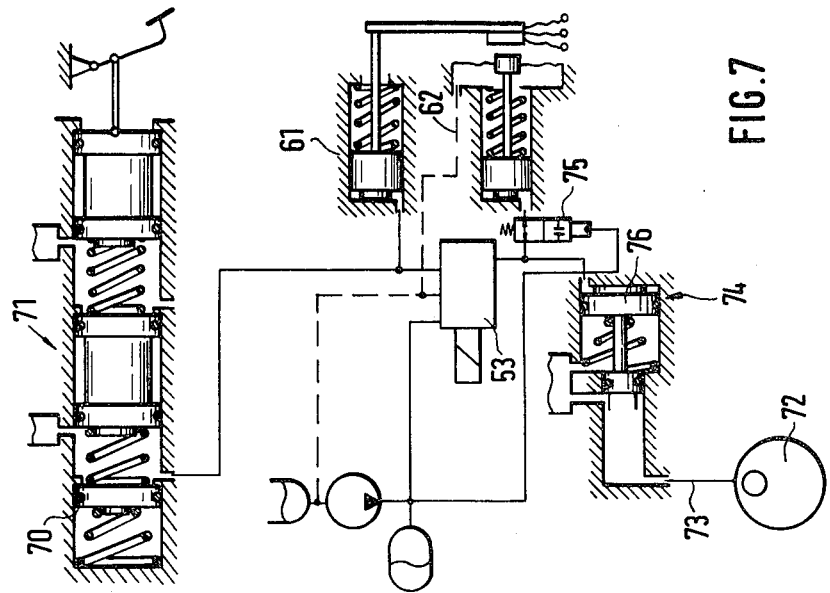
FIG. 7 shows a different valve type.

FIG. 7 shows a design in which a travel path simulator 70 is located in a tandem main cylinder 71. In addition, a pressure translator 74 is disposed ahead of one wheel brake cylinder 72 in a brake line 73.

This type of design has two advantages:

1. A low pressure level suffices for the servopressure supply apparatus. As a result, the pump can be realized in a simpler and less expensive form.

2. If a leak occurs in the brake circuit following the pressure translator 74, the energy supply does not fail.

A closing valve 75 is also disposed in the line to the second pressure gauge in the design shown in FIG. 7; this valve 75 is closed if the storage-tank pressure of the servo-pressure supply apparatus has dropped below a predetermined level. Because of this closing valve 75, a piston 76 in the pressure translator 74 can be embodied in a simpler manner, since with an intact energy supply the leakage flow can be fed back into the return flow line.

Figure 8:
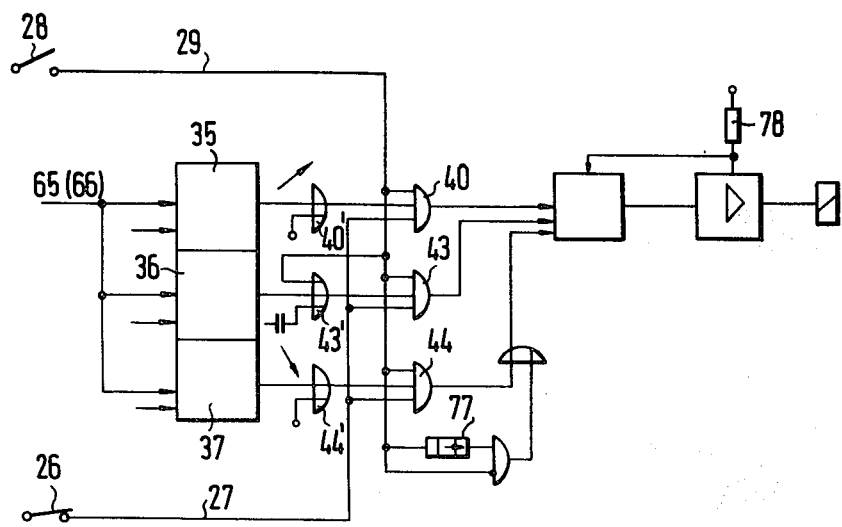
FIG. 8 is a circuit diagram for an electronic amplification system.

The circuit diagram shown in FIG. 8 differs from FIG. 4 in that, among other differences, a timing element 77 is used. The anti-wheel-lock signals act simultaneously on the OR gates 40', 43', 44', and the three operating positions for pressure supply, pressure maintenance and pressure reduction are again required for the functioning of the OR gates. The multiple-position valve is triggered via a current regulating circuit of a known design. The voltage, which is proportional to the current, is delivered via a measuring resistor to the current regulating circuit. The pedal-position switching signal acts to effect the pressure maintenance position, via an OR switching element at the output of the comparator. This circuit is advantageous in order to create definite relationships between the primary and secondary brake circuits for the case where the energy supply is intact. Without this circuit, the varying ventilation status of the secondary circuit would have a corresponding, undesirable effect on the pedal characteristic. In order to assure that the zero pressure level is attained in the secondary circuit following the end of the braking process and the opening of the brake light switch, the valve is switched into position 4 (pressure reduction) via the timing element 77.

Figure 9:
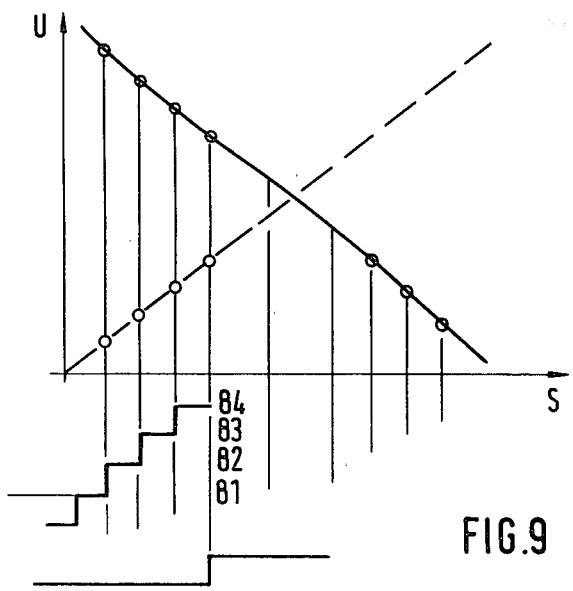
FIG. 9 is a diagram.

FIG. 9 shows a diagram relating to the response characteristic of the electronic apparatus. Operation with either a rising or a falling signal is possible, depending on the design of the pressure gauges. Valve switching positions are controlled in accordance with appropriate switching thresholds 81, 82, 83, 84. The thresholds 81, 82, 83 have the property of hysteresis, so as to prevent constant switching back and forth on the part of the multiple-position valves.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A vehicle brake system having a main cylinder which supplies hydraulic pressure to hydraulic brake cylinders associated with the vehicle wheels, said system further having an anti-wheel-lock apparatus and includes a multiple-position valve for switching a line passage to the brake cylinders, and controlling a servopressure supply apparatus, characterized in that said main cylinder and the servopressure supply apparatus are connected in parallel to said multiple-position valve, said system further including a pair of pressure gauges with one gauge disposed before said multiple-position valve, said pressure gauges arranged to receive hydraulic fluid under pressure and to emit output signals which are compared with one another in an electronic braking comparison unit and further wherein the result of comparison can be delivered as a control signal to said multiple-position valve.

2. A vehicle brake system as defined by claim 1, characterized in that each of said pressure gauges include electrical pressure transducers.

3. A vehicle brake system as defined by claim 2, characterized in that said electronic brake unit further includes a brake light switch as a signal means.

4. A vehicle brake system as defined by claim 2, characterized in that said main cylinder is in communication with a travel path simulator.

5. A vehicle braking system as defined by claim 2; said electronic braking comparison unit comprising a comparator circuit characterized in that each of said pressure gauges emit signals which are evaluated and amplified in said comparator circuit.

6. A vehicle brake system as defined by claim 1, characterized in that said main cylinder is in communication with a travel path simulator.

7. A vehicle brake system as defined by claim 6, characterized in that said electronic braking unit is combined with an electronic anti-wheel-locking unit.

8. A vehicle brake system as defined by claim 7, characterized in that said servopressure supply apparatus and the position of a pedal which actuates said main cylinder can be monitored via different switches which are connected via a line to said electronic braking unit.

9. A vehicle brake system as defined by claim 6, characterized in that said servopressure supply apparatus and the position of a pedal which actuates said main cylinder can be monitored via different switches which are connected via a line to said electronic braking unit.

10. A vehicle braking system as defined by claim 1; said electronic braking comparison unit comprising a comparator circuit characterized in that each of said pressure gauges emit signals which are evaluated and amplified in said comparator circuit.

11. A vehicle brake system as defined by claim 1, characterized in that said pressure gauges further include piston members having an electrical travel path meter, said signals of said travel path meter being evaluatable in said electronic braking comparison unit.

12. A vehicle brake system as defined by claim 11, characterized in that said piston members have different effective diameters in accordance with the desired amplification ratio between said main cylinder brake pressure and the pressure of said servopressure supply apparatus.

13. A vehicle brake system as defined by claim 12, characterized in that said travel path meter comprises a position switch which is disposed between the two piston members.

14. A vehicle brake system as defined in claim 12, characterized in that said travel path meter comprises a Hall integrated circuit which is disposed between the two piston members.

15. A vehicle brake system as defined by claim 11, characterized in that said travel path meter comprises a position switch which is disposed between the two piston members.

16. A vehicle brake system as defined by claim 11, characterized in that said travel path meter comprises a Hall integrated circuit which is disposed between the two piston members.

17. A vehicle brake system as defined by claim 1, characterized in that said main cylinder further includes a travel path simulator which is integrated into a piston member of one pressure gauge.

18. A vehicle brake system as defined by claim 1, characterized in that one pressure gauge is combined with a pressure translator.

* * * * *